United States Patent
Manger et al.

(10) Patent No.: US 11,519,621 B2
(45) Date of Patent: Dec. 6, 2022

(54) SYSTEMS, METHODS, AND AN APPARATUS FOR CONTROLLING A SLEEP ENVIRONMENT AND WAKING A SLEEPING PERSON

(71) Applicants:UNIVERSITY OF THE WITWATERSRAND, JOHANNESBURG, Johannesburg (ZA); THE REGENTS OF THE UNIVERSITY OF CALIFORNIA, Oakland, CA (US)

(72) Inventors: Paul Robert Manger, Johannesburg (ZA); Joshua Gabriel Davimes, Johannesburg (ZA); Adhil Bhagwandin, Johannesburg (ZA); Iiike Bianca Philander, Johannesburg (ZA); Jerome Melvin Seigel, Oakland, CO (US)

(73) Assignees: University of the Witwatersrand, Johannesburg, Braamfontein (ZA); The Regents of the University Of California, Oakland, CA (US)

( * ) Notice: Subject to any disclaimer, the term of this patent is extended or adjusted under 35 U.S.C. 154(b) by 0 days.

(21) Appl. No.: 17/284,425

(22) PCT Filed: Oct. 11, 2019

(86) PCT No.: PCT/IB2019/058691
§ 371 (c)(1),
(2) Date: Apr. 9, 2021

(87) PCT Pub. No.: WO2020/075132
PCT Pub. Date: Apr. 16, 2020

(65) Prior Publication Data
US 2021/0348786 A1 Nov. 11, 2021

(30) Foreign Application Priority Data

Oct. 12, 2018 (ZA) ................................. 2018/06789

(51) Int. Cl.
*G05B 19/042* (2006.01)
*F24F 11/30* (2018.01)
*F24F 11/63* (2018.01)

(52) U.S. Cl.
CPC .............. *F24F 11/30* (2018.01); *F24F 11/63* (2018.01); *G05B 19/042* (2013.01); *G05B 2219/2614* (2013.01)

(58) Field of Classification Search
CPC ........ F24F 11/30; F24F 11/63; F24F 2110/00; F24F 2110/10; F24F 2110/20; G05B 19/042; G05B 2219/2614
See application file for complete search history.

(56) References Cited

U.S. PATENT DOCUMENTS 8,600,561 B1   12/2013  Modi
2012/0298348 A1* 11/2012  Mise ........................ F24F 11/62
                                                          165/287

(Continued)

FOREIGN PATENT DOCUMENTS

CN     101315215 A    4/2008
CN     104864568 A    8/2015

(Continued)

OTHER PUBLICATIONS

International Bureau, "International Preliminary Report on Patentability", in Application No. PCT/IB2019/058691, dated Apr. 8, 2021, 11 pages.

(Continued)

*Primary Examiner* — Michael W Choi
(74) *Attorney, Agent, or Firm* — Hickman Becker Bingham Ledesma LLP (57) ABSTRACT

This invention relates to a systems, methods and apparatuses for controlling a sleep environment, particularly for control- (Continued)

ling an indoor sleep environment, and to a method and system of waking a sleeping person. The invention monitors one or both of wet-bulb globe temperatures (WBGTs) within the sleep environment and outdoors with a view to either altering the WBGT within the sleep environment to mimic a nadir or inflection point typically found outdoors and/or generate an alarm when a nadir or inflection point of the WBGT outdoors is determined.

14 Claims, 5 Drawing Sheets

(56) References Cited

U.S. PATENT DOCUMENTS

| 2016/0116178 A1 | 4/2016 | Vega |
| 2016/0261425 A1 | 9/2016 | Horton |
| 2019/0179275 A1* | 6/2019 | Berman ............... G05B 19/042 |
| 2019/0209806 A1* | 7/2019 | Allen ................... A61M 21/02 |

FOREIGN PATENT DOCUMENTS

| CN | 105928157 A | 9/2016 |
| WO | WO 2020/075132 A1 | 4/2020 |
| WO | WO 2010/087386 A1 | 8/2020 |

OTHER PUBLICATIONS

European Patent Office, "Search Report", in Application No. PCT/IB2019/058691, dated Sep. 3, 2020, 5 pages.
European Patent Office, "Written Opinion", in Application No. PCT/IB2019/058691, dated Sep. 3, 2020, 10 pages.
Current Claims, in Application No. PCT/IB2019/058691, dated Oct. 11, 2019, 10 pages.

* cited by examiner

SYSTEMS, METHODS, AND AN APPARATUS FOR CONTROLLING A SLEEP ENVIRONMENT AND WAKING A SLEEPING PERSON

RELATED APPLICATION DATA AND CLAIM OF PRIORITY

This application is a US National Stage Patent Application filed under 35 U.S.C. § 371 based upon International Patent Application No. PCT/IB2019/058691 filed 11 Oct. 2019, which claims the benefit of South African Application 2018/06789, filed 12 Oct. 2018, the entire contents of all of which are hereby incorporated by reference as if fully set forth herein for all purposes.

FIELD OF INVENTION

THIS INVENTION relates to a system, method and apparatus for controlling a sleep environment, particularly for controlling an indoor sleep environment, and to a method and system of waking a sleeping person.

BACKGROUND TO THE INVENTION

Sleep is an important physiological requirement for most living creatures, including Homo sapiens, or "humans" for brevity. However, since the industrial era, and, inter alia, the move of humans into built up insulated and electrified communities, buffered from the natural rhythms of the environment, there has been a disruption to "natural" sleep and an increase in sleep-related disorders such as insomnia. For example, there is a lack of insomnia in hunter-gatherer societies, whereas insomnia affects 10-15% of people in industrial societies. Altered sleep patterns in industrial societies have purportedly been linked to obesity, mood disorders, and a host of other physical and mental illnesses.

The Applicant is aware of numerous commercially available devices that purport to improve one's sleep. These devices range from bracelets that tune a person in to the "Natural Frequencies" of the globe, to blue light sleep aids. The problem with prior art devices, which the Applicant is aware of, is that none of these devices work effectively resulting in people resorting to taking sleeping pills in order to achieve a better night's sleep.

Though sleeping pills enable people to sleep, they do so in a manner that compromises the biochemical balance in the human body with external drugs, which often come with side effects, such as the shortening of the life span, whereas untreated insomnia does not shorten life span.

It is therefore an object of the present invention to provide a means to control a sleep environment, particularly one or more environmental conditions within the sleep environment, to render the same conducive for encouraging natural sleep patterns. In particular, it is an object of the present invention to provide that a means to at least wake a person more naturally from sleep.

SUMMARY OF THE INVENTION

According to a first aspect of the invention, there is provided a method for controlling a sleep environment, wherein the method comprises:
monitoring one or more indoor environmental conditions within the sleep environment by way of one or more suitable sensors; and
generating, by way of a suitable processor, one or more control signals to control one or more electrically actuatable devices to alter the monitored one or more indoor environmental conditions within the sleep environment such that a nadir or inflection point of the monitored one or more indoor environmental conditions occurs substantially at or around a particular inflection time.

The nadir or inflection point may be one or more lowest values of the monitored one or more indoor environmental conditions prior to increase thereof by way of the one or more electrically actuatable devices.

The particular inflection time may be a time substantially at or around a time which one or more monitored outdoor environmental conditions at an outdoor location reaches a nadir or inflection point.

The particular inflection time may be a pre-selected or pre-determined time, or related to/associated with a pre-selected or pre-determined time. The pre-selected or pre-determined time may a time which a person sleeping within sleep environment desires to awaken.

The method may comprise monitoring one or more outdoor environmental conditions at the outdoor location by way of one or more suitable sensors; and selecting the particular inflection time as the time substantially at or around which one or more monitored outdoor environmental conditions reaches a nadir or inflection point.

The method may comprise:
retrieving outdoor environmental condition data from an outdoor environmental condition data source, wherein the outdoor environmental condition data is indicative of the monitored one or more environmental conditions at the outdoor location; and
determining a variance value in the retrieved outdoor environmental condition data indicative of a variation of the one or more outdoor environmental conditions, and wherein the one or more control signals generated controls the one or more electrically actuatable devices to alter one or more indoor environmental conditions within the sleep environment by the determined variance value so as to mimic the variation of the one or more monitored outdoor environmental condition within the sleep environment.

According to a second aspect of the invention, there is provided a method for controlling a sleep environment of a person, wherein the method comprises:
receiving and/or retrieving outdoor environmental condition data from an outdoor environmental condition data source, wherein the outdoor environmental condition data is indicative of one or more environmental conditions at an outdoor location;
determining a variance value in the received environmental condition data indicative of a variation of the one or more outdoor environmental conditions; and
generate one or more control signals to control one or more electrically actuatable devices to alter one or more indoor environmental conditions within the sleep environment by the determined variance value so as to mimic the variation in the one or more outdoor environmental condition data in the sleep environment.

The method may comprise the step of monitoring the received outdoor environmental condition data.

The environmental condition data source may be one or more of an external data store, local data store, one or more environmental condition sensors, and the like. It will be noted that in one example embodiment, the external or local storage may store environmental condition data acquired by one or more environmental condition sensors.

The method may comprise receiving indoor environmental data from one or more sensors, wherein the indoor environmental condition data is indicative of one or more environmental conditions within the sleep environment.

The one or more indoor and outdoor environmental conditions may be matched.

It will be understood that the outdoor location may be any outdoor location selected by the user.

The variance value may be calculated based on differences in temporally spaced outdoor environmental condition data received. The variance value may be calculated as a percentage increase or decrease of the one or more outdoor environmental conditions monitored. In this regard, the method may comprise generating one or more control signals to control the actuatable devices to increase or decrease the one or more indoor environmental conditions in the sleep environment by the percentage increase or decrease calculated in respect of the one or more outdoor environmental conditions monitored.

In one example embodiment, the step of generating one or more control signals may be done in response to determining that the determined variance value is an actionable variance value, i.e., a variance value above, below, or equal to a predetermined variance value threshold. For example, the control signals are not generated if the variance value expressed as a percentage is less than 2% as an increase or decrease of the one or more outdoor environmental conditions monitored.

The method may comprise a prior step of:
receiving a pre-selection of one or more desired indoor environmental conditions within the sleep environment; and
generating one or more control signals to control the one or more electrically actuatable devices to maintain the one or more desired indoor environmental conditions in the sleep environment.

It will be understood that the method may comprise generating the one or more control signals to control the one or more electrically actuatable devices to alter the one or more desired indoor environmental conditions within the sleep environment by the determined variance value.

The one or more electrically actuatable devices may be operatively located in the sleep environment.

The sleep environment may be indoors in that it is not exposed to the outdoor elements. In this regard, the sleep environment may be a bedroom or room in a building, ship, plane, vehicle, or the like.

In one example embodiment, the outdoor location may be spatially/geographically near or adjacent the sleep environment. In this regard, the outdoor location may be in the vicinity of the sleep environment but exposed to the elements or outside environment associated with the sleep environment. For example, the sleep location may be a bedroom in a building and the outdoor location may be outside the building but adjacent thereto.

Instead, or in addition, it will be noted that in one example embodiment, the outdoor location may be spatially/geographically separated from the sleep environment. In this regard, the outdoor location may not be in close proximity to the sleep environment but may be exposed to the elements or outside environment in a general area in which the sleep location is located. For example, the sleep location may be a bedroom in a building located in a town and the outdoor location may be outside the building and spatially/geographically spaced therefrom but located in the town. Alternatively, the outside environment may be geographically remote, with the data accessible through cloud storage.

In particular, the one or more indoor and outdoor environmental conditions may be a combination of at least temperature and humidity. The indoor temperature and humidity may have pre-determined bounds, i.e., pre-determined minimum and maximum values. The indoor temperature and humidity may be individually controllable. In a preferred example embodiment, the one or more indoor and outdoor environmental conditions maybe a wet-bulb globe temperature (WBGT). The WBGT may be an apparent or real-feel temperature which may be a value indicative of ambient air temperature, relative humidity, solar radiation, and wind speed.

By mimicking the variation in the outdoor condition monitored, a nadir/inflexion point, being the lowest point in the outdoor condition monitored is mimicked.

It follows that the indoor environmental data may be indoor wet-bulb globe temperatures (WBGTs). Similarly, the outdoor environmental condition data may be outdoor wet-bulb globe temperatures (WBGTs).

The one or more sensors may be one or more a wet-bulb globe temperature (WBGT) sensors.

The one or more actuatable devices may be one or a combination of an air-conditioning unit, a humidifier, or the like configured to control the temperature and/or humidity of the sleep environment. In other words, the one or more actuatable devices may be configured to control the wet-bulb globe temperature of the sleep environment.

According to a third aspect of the invention, there is provided a system for controlling a sleep environment, the system comprising:
memory storage device configured to store data; and
a processor communicatively coupled to the memory storage device and configured to:
monitor one or more indoor environmental conditions within the sleep environment by way of one or more suitable sensors; and
generate one or more control signals to control one or more electrically actuatable devices to alter the monitored one or more indoor environmental conditions within the sleep environment such that a nadir or inflection point of the monitored one or more indoor environmental conditions occurs substantially at or around a particular inflection time.

The processor may be configured to monitor one or more outdoor environmental conditions at the outdoor location by way of one or more suitable sensors; and select the particular inflection time as the time substantially at or around which one or more monitored outdoor environmental conditions reaches a nadir or inflection point.

The processor may be configured to:
retrieve outdoor environmental condition data from an outdoor environmental condition data source, wherein the outdoor environmental condition data is indicative of the monitored one or more environmental conditions at the outdoor location; and
determine a variance value in the retrieved outdoor environmental condition data indicative of a variation of the one or more outdoor environmental conditions,
and wherein the one or more control signals generated by the processor is configured to control the one or more electrically actuatable devices to alter one or more indoor environmental conditions within the sleep environment by the determined variance value so as to mimic the variation of the one or more monitored outdoor environmental condition within the sleep environment.

According to a fourth aspect of the invention system for controlling a sleep environment, the system comprising:
memory storage device; and
a processor communicatively coupled to the memory storage device and configured to:
receive and/or retrieve outdoor environmental condition data from an outdoor environmental condition data source, wherein the outdoor environmental condition data is indicative of one or more environmental conditions at an outdoor location;
monitor the received outdoor environmental condition data to determine a variance value in the received environmental condition data indicative of a variation of the one or more outdoor environmental conditions; and
generate one or more control signals to control one or more electrically actuatable devices located adjacent the sleep environment to alter one or more indoor environmental conditions within the sleep environment by the determined variance value so as to mimic the variation in the one or more outdoor environmental conditions in the sleep environment.

It will be understood that the outdoor location may be any outdoor location selected by the user.

It will be appreciated by those skilled in the art that the comments above regarding the first and second aspects of the invention apply herein as well, mutatis mutandis. This is because the methods according to the first and second aspects of the invention may be implemented by the system according to the third and fourth aspects of the invention.

The processor may be configured to receive indoor environmental data from one or more sensors, wherein the indoor environmental condition data is indicative of one or more environmental conditions within the sleep environment.

The system may comprise the one or more sensors which may be communicatively coupled to the processor. As mentioned above, the sensors may be in the form of wet-bulb globe temperature (WBGT) sensors.

As mentioned above, the one or more electrically actuatable devices may be in the form of one or a combination of an air-conditioner, humidifier, or the like. The system may comprise the one or more actuatable devices. The one or more actuatable devices may be communicatively coupled to the processor so as to be controlled thereby.

According to a fifth aspect of the invention, there is provided an apparatus comprising:
a heat exchanger;
a humidifier;
memory storage device; and
a processor communicatively coupled to the heat exchanger, humidifier and memory storage device configured to:
receive outdoor environmental condition data from an outdoor environmental condition data source, wherein the outdoor environmental condition data is indicative of one or more environmental conditions at an outdoor location;
monitor the received outdoor environmental condition data to determine a variance value in the received environmental condition data indicative of a variation of the one or more outdoor environmental conditions; and
generate one or more control signals to control the heat exchanger and the humidifier to alter the one or more indoor environmental conditions within the sleep environment by the determined variance value so as to mimic the variation in the one or more outdoor environmental conditions in the sleep environment.

The processor may be configured to receive indoor environmental data from one or more sensors, wherein the indoor environmental condition data is indicative of one or more environmental conditions within the sleep environment.

The devices may be located adjacent the sleep environment.

The outdoor location may be any outdoor location selected by the user.

According to a sixth aspect of the invention, there is provided a method for generating an alarm signal for waking a sleeping person, wherein the method comprises:
receiving outdoor environmental condition data from an outdoor environmental condition data source, wherein the outdoor environmental condition data is indicative of one or more environmental conditions at an outdoor location;
monitoring the received outdoor environmental condition data to determine a variance value in the received environmental condition data indicative of a variation of the one or more outdoor environmental conditions; and
generating one or more alarm signals based on the determined variance value, wherein the one or more alarm signals are suitable for actuating one or more alarm devices.

It will be understood that the outdoor location may be any outdoor location selected by the user.

The alarm may be generated at the inflexion/nadir point. The nadir/inflexion point may be the lowest point in the monitored outdoor condition data which is indicative of the outdoor condition monitored. The nadir/inflection point may the point at or near where the monitored outdoor condition increases in value.

In the context of the specification, the nadir/inflection point may be at or near the lowest WBGT prior to a rise in the WBGT within the sleep environment.

According to a seventh aspect of the invention, there is provided a system for generating an alarm signal for waking a sleeping person, the system comprising:
memory storage device; and
a processor communicatively coupled to the memory storage device and configured to:
receive outdoor environmental condition data from an outdoor environmental condition data source, wherein the outdoor environmental condition data is indicative of one or more environmental conditions at an outdoor location;
monitor the received outdoor environmental condition data to determine a variance value in the received environmental condition data indicative of a variation of the one or more outdoor environmental conditions; and
generate one or more alarm signals based on the determined variance value, wherein the one or more alarm signals are suitable for actuating one or more alarm devices.

The alarm will be generated at the inflexion/nadir point. The nadir/inflexion point may be the lowest point in the monitored outdoor condition.

It will be evident to those skilled in the art that the comments herein regarding the systems and methods disclosed may apply mutatis mutandis to each of the systems and methods disclosed. Moreover, some features of the system/s and method/s described herein may be found in the accompanying claims.

According to an eighth aspect of the invention, there is provided a method for controlling a sleep environment of a person, wherein the method comprises generating one or more control signals to control one or more electrically actuatable devices to alter one or more indoor environmental conditions within the sleep environment so as to have a nadir point in the one or more environmental conditions coinciding substantially at or associated with a pre-selected time at which the person is to awaken.

According to a ninth aspect of the invention, there is provided a computer readable medium containing non-transitory instructions for controlling at least one programmable automated processor to perform the method and/or method steps described above.

DETAILED DESCRIPTION OF THE DRAWINGS

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and may even be desirable in certain circumstances and are a part of the present invention. Thus, the following description is provided as illustrative of the principles of the present invention and not a limitation thereof.

It will be appreciated that the phrase "for example," "such as", and variants thereof describe non-limiting embodiments of the presently disclosed subject matter. Reference in the specification to "one example embodiment", "another example embodiment", "some example embodiment", or variants thereof means that a particular feature, structure or characteristic described in connection with the embodiment(s) is included in at least one embodiment of the presently disclosed subject matter. Thus, the use of the phrase "one example embodiment", "another example embodiment", "some example embodiment", or variants thereof does not necessarily refer to the same embodiment(s).

Unless otherwise stated, some features of the subject matter described herein, which are, described in the context of separate embodiments for purposes of clarity, may also be provided in combination in a single embodiment. Similarly, various features of the subject matter disclosed herein which are described in the context of a single embodiment may also be provided separately or in any suitable sub-combination.

Figure 1:
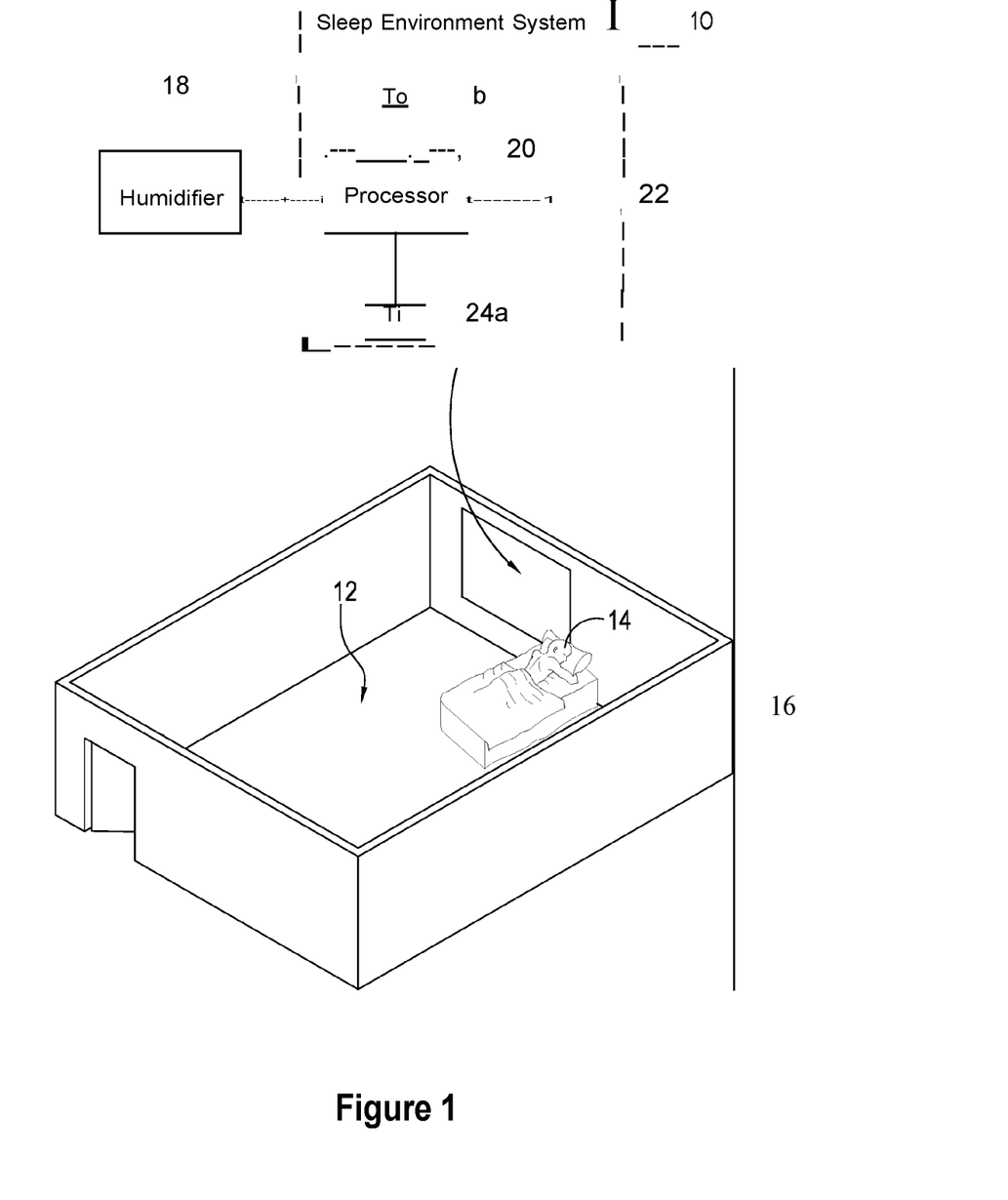
FIG. 1 shows a schematic diagram of a system in accordance with an example embodiment of the invention.

Referring to FIG. 1 of the drawings, a system in accordance with one example embodiment of the invention is generally indicated by reference numeral 10.

The system 10 is typically a system for controlling a sleep environment 12 of a person 14, particularly an environment adjacent a person 14 sleeping. The sleep environment 12 is typically in the form of a bedroom in a building 16, for example, a single dwelling, apartment, or the like. In some example embodiments, the sleep environment 12 is in the form of a cabin or sleeping quarters in a vessel such as a boat, ship, train, car, bus, airplane, spaceship, space station, or the like.

The sleep environment 12 in the context of this specification may therefore be any environment which is not directly exposed to the elements, i.e., an environment which is indoors. Moreover, the sleep environment 12 may be understood to include an environment having environmental conditions which may be altered and/or maintained by one or more electrically actuatable devices 18.

The one or more environmental conditions may be both temperature and humidity. However, it will be appreciated that the one or more environmental conditions may be only temperature or humidity. The device/s 18 may therefore be one or a combination of heat exchanger/s, for example, air-conditioner/HVAC/s, and humidifiers. In a preferred example embodiment, the one or more environmental conditions controlled by the one or more devices 18 is a real-feel or apparent temperature. The real-feel or apparent temperature may be a combination of ambient air temperature, relative humidity, solar radiation, and wind speed. In a preferred example embodiment, the one or more environmental conditions may be a wet-bulb globe temperature (WBGT) in the sleep environment 12, which is effectively a combination of temperature and humidity measurements in the sleep environment 12.

The WBGT may be indicative of a "real-feel" or apparent temperature in the environment 12. In this regard, the WBGT may be calculated as follows:

$$WBGT = 0.7 T_w + 0.2 T_g + 0.1 T \tag{1}$$

wherein $T_w = T \times a\ \tan[0.151977(RH\ \% + 8.313659)^{0.5}] + a\ \tan(T + RH\ \%) - a\ \tan(RH\ \% - 1.676331) + 0.00391838(RH\ \%)^{-15} \times a\ \tan(0.023101\ RH\ \%) - 4.686035$, T is ambient air temperature, RH % is relative humidity in percentage, and $T_g$ is black globe temperature.

The device 18 may thus be in the form of an air conditioner-humidifier device 18 configured to regulate the wet-bulb globe temperature within the sleep environment 12. In some example embodiments the device 18 may be in the form of a separate air conditioner and humidifier to regulate the wet-bulb globe temperature. However, for ease of explanation, reference will be made to the device 18 being a combination of an air conditioner and a humidifier able to control both the temperature and humidity within the sleep environment.

Also for ease of explanation, and brevity, reference will now be made to the sleep environment being a bedroom 12, wherein the wet-bulb globe temperature (WBGT) within the bedroom 12 is controllable by the air-conditioner-humidifier device 18.

The device 18 is typically controllable by one or more control signals received by the system 10. To this end, the system 10 comprises a processor 20, a memory store 22, as well as wet-bulb globe temperature sensors Ti 24a and To 24b located adjacent the bedroom 12, particularly inside the bedroom 12, and outside the bedroom at a location that is outdoors to the bedroom 12. In some example embodiments, the sensors Ti 24a and To 24b may be suitable sensors configured to output electrical signals representative of WBGT measured thereby. Alternatively, the sensors Ti 24a and To 24b may be a combination of temperature and humidity sensors which are configured to output electrical signals representative of temperature and humidity measured, wherein the processor 20 is configured to calculate WBGT based on the signals received from the sensors Ti 24a and To 24b, for example, using Equation 1 above after receiving measured T, RH %, and $T_g$.

The processor 20 may be one or more processors in the form of programmable processors executing one or more computer programs to perform actions by operating on input data and generating output control signals to control at least the device 18. The processor 20 may be any kind of electronic device with data processing capabilities including, by way of non-limiting example, a general processor, a graphics processing unit (GPU), a digital signal processor (DSP), a microcontroller, a field programmable gate array (FPGA), an application specific integrated circuit (ASIC), or any other electronic computing device comprising one or more processors of any kind, or any combination thereof.

The processor 20 may be communicatively coupled to the device 18, as well as the sensors Ti 24a, To 24b, and memory store 22 in a hard-wired fashion, or wirelessly. It will be understood by those skilled in the art that though not illustrated, the system 10 may comprise suitable biasing and/or driving ancillary electronic components, wiring, and the like.

The memory store/storage device 22 may be in the form of computer-readable medium including system memory and including random access memory (RAM) devices, cache memories, non-volatile or back-up memories such as programmable or flash memories, read-only memories (ROM), etc. In addition, the memory store 22 may be considered to include memory storage physically located elsewhere in the system 10, e.g., any cache memory in the processor 20 as well as any storage capacity used as a virtual memory, e.g., as stored on a mass storage device.

It will be appreciated that the computer programs executable by the processor 20 may be written in any form of programming language, including compiled or interpreted languages, declarative or procedural languages, and can be deployed in any form, including as a stand-alone program or as a module, component, subroutine, object, or other unit suitable for use in a computing environment. The computer program may, but need not, correspond to a file in a file system. The program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). The computer program can be deployed to be executed by one processor 20 or by multiple processors 20, even those distributed across multiple locations.

The computer programs may be stored in the memory store 22 or in memory provided in the processor 20 in a non-transitory fashion.

Though not illustrated, it will be appreciated that the system 10 may comprise one or more user input devices (e.g., a keyboard, a mouse, imaging device, scanner, microphone, a wireless receiver, smart phone, tablet, computer, or the like) and a one or more output devices (e.g., a Liquid Crystal Display (LCD) panel, a sound playback device (speaker), switches, valves, wireless transmitter. In this way the person 14 may input information into the system 10 and receive outputs.

In one example embodiment (not shown), the system 10, or most of the same, may be embedded into an apparatus which may comprise the device 18 as described herein so as to be integral therewith. In this example embodiment, the apparatus may be hardwired to the sensor To 24b located outside. For ease of explanation, reference will be made to the example embodiment illustrated in FIG. 1, wherein the system 10 is separate from but operatively interfaced with the device 18.

The processor 20 is configured to receive or retrieve an indoor WBGT from the WBGT sensor Ti 24a which is located inside the bedroom 12. The sensor Ti 24a is thus indoors. In some example embodiments, the sensor Ti 24a may comprise separate thermal sensor/thermocouple and a humidity sensor/hygrometer to obtain separate measurements which are combined. However, it will be noted that in some example embodiments, such as those under discussion, the sensor Ti 24a is a single WBGT sensor Ti 24a configured to obtain a single WBGT measurement inside the bedroom 12.

Similar comments with reference to sensor Ti 24a apply to the sensor To 24b, which is substantially similar to the sensor Ti 24a. However, it will be noted that the processor 20 is configured to receive outdoor WBGT from the sensor To 24b. In this regard, the sensor To 24b is located outside of the bedroom 12, particularly outdoors and exposed to the elements. In this regard, it will be appreciated that the processor 20 is configured to receive WBGTs just outside of the bedroom 12, outdoors. In the context of this specification the term "outside" and "inside" may be used interchangeably with the terms "outdoors" and "indoors" respectively.

The sensor To 24b may be mounted outside of the bedroom 12 and outside of the building 16 and a hardwired connection, in the form of a wired conductive line, is run from the sensor To outside to the processor 20. The processor 20 may be adjacent the device 18, for example, inside the bedroom 12. A similar setup may be applicable to the sensor Ti 24a although the sensor Ti 24a is located in the bedroom 12. Variations from this setup will be evident for those skilled in the art and will be more evident from the discussion which follows, for example, in areas with central devices 18, the processor 20 and thus the device 18 need not necessarily be located in the room 12.

The processor 20 is configured to monitor the outside WBGT from the sensor To 24b and determine variation values indicative of temporal WBGT variations. The processor 20 may be configured to achieve this in a plurality of different ways, for example, the processor 20 may be configured to store, in the memory storage device 22, a predetermined amount of data received from the sensor To 24b indicative of outside WBGT, wherein the processor 20 is configured to allocate a time stamp to the data received. The processor is then configured to calculate differences between data received at time t and t−1 and average the same over a predetermined temporal window so as to obtain a variation value which is indicative of whether the outside WBGT is increasing, decreasing, or remaining constant. In this way, the nadir/inflexion point in the WBGT measured may be determined and effectively mimicked in the manner described herein. It will be noted that the variation value may be expressed as a percentage. For example, the processor 20 may be configured to determine that over a predetermined period of time, for example, a five-minute period of time, the outside WBGT has increased by a variation value of 10%.

The processor 20 may be configured to generate one or more signals to control the device 18 based on the determined variation value to alter the WBGT inside the bedroom 12 to mimic the outside WBGT. For example, if the outside WBGT has increased by a variation value of 10%, then the device 18 is configured to increase the indoor WBGT by 10% based on the predetermined or pre-set desired WBGT of the bedroom 12 selected by the person 14. To this end, the processor 20 may be configured to regulate the WBGT in the bedroom 12 corresponding to the variances in the outdoor WBGT by suitably controlling the devices 18. The processor 20 may be configured to implement suitable feedback loops to this end. In this regard, the processor 20 may be configured to switch the device 18 between ON and OFF states via a relay or suitable switch to achieve the desired WBGT.

In some example embodiments, the processor 20 may be configured to only generate one or more signals to control the device 18 if the determined variation value is above, below, or at a predetermined threshold. For example, for variations values of 1%-3% over a pre-determined period of 5 minutes, the processor 20 may be configured to ignore these slight variations in outdoor WBGT and not control the device 18.

The processor 20 may be further configured to generate the one or more control signals in response to the variation values being above, below, or at a plurality of different thresholds. For example, the processor 20 may only generate the control signals if the variation values indicate variations of 10% and over, or the like.

In one example embodiment (not illustrated), it will be appreciated that the system as described herein, particularly the processor 20, may be configured to generate an alarm signal in addition to, or instead of, the control signal as described herein based on the determined variation value. In this example embodiment, it will be understood by those skilled in the art that the processor 20 may be configured to generate an alarm signal for controlling one or more buzzers, lights, sound systems, particularly switches associated therewith, in response to determining that the determined variation value or values is/are above, below or at a predetermined threshold value/s.

For example, in one example embodiment, the processor 20 is configured to determine a nadir of outside WBGT based on the determined variance values, for example, if in the last 5 minutes the variance values indicated a drop in outside WBGT by 5% and the next five minutes the variance values indicate an increase in WBGT temperature by 10%, this would be indicative of a nadir in outside WBGT being reached and hence the processor 20 may generate an alarm and/or suitable control signal.

It will be understood by those skilled in the art that there may be many ways in which to determine the nadir of outside WBGT using the outside WBGT in order to generate the alarm signals as contemplated herein. Also, it will be appreciated that the alarm may sound a predetermined period after the nadir has been detected by the system.

In yet another example embodiment (also not shown), the outdoor sensor To 24b may be located in a geographically spaced location to the geographic location of the bedroom 12 and thus building 16. In this contemplated example embodiment, the sensor To 24b may be configured to communicate with the processor 20 over a communications network, for example, via one or more servers and suitably mated network interfaces. In this way, the processor 20 may be configured to receive outside WBGT from geographic locations other than that in which the person 14 is located. It will be noted that in these example embodiments, the system 10 may be wirelessly accessible, for example, over said communication network by a suitable computing device such as a smartphone, or the like, for a user 14 to select the geographic location which they would want to have their bedroom or inside WBGT matched to.

In yet further example embodiments (not illustrated), there is no requirement for the sensor To 24b to be provided as part of the system 10 as the processor 20 is configured to receive outdoor condition data from a suitable outdoor condition data source. The outdoor condition data source may be the memory storage device 22 storing data associated with To 24b which it transmits to the processor 20. In this example embodiment, the device 22 may store data indicative of WBGT, for example, WBGT associated with predetermined geographical locations, time of year, and the like. In this way, a user wanting to have a sleep experience in a location such as Tahiti will be able to choose a Tahiti as a preselected location stored in the memory device 22 so that the processor 20 receives WBGT from the device 22 in a similar fashion as it would from the sensor To 24b. Alternately, the outdoor condition data source may be an online source, wherein the processor 20 is coupled to a suitable network interface device to communicate with the online source over a communication network for example those contemplated herein.

Figure 2:
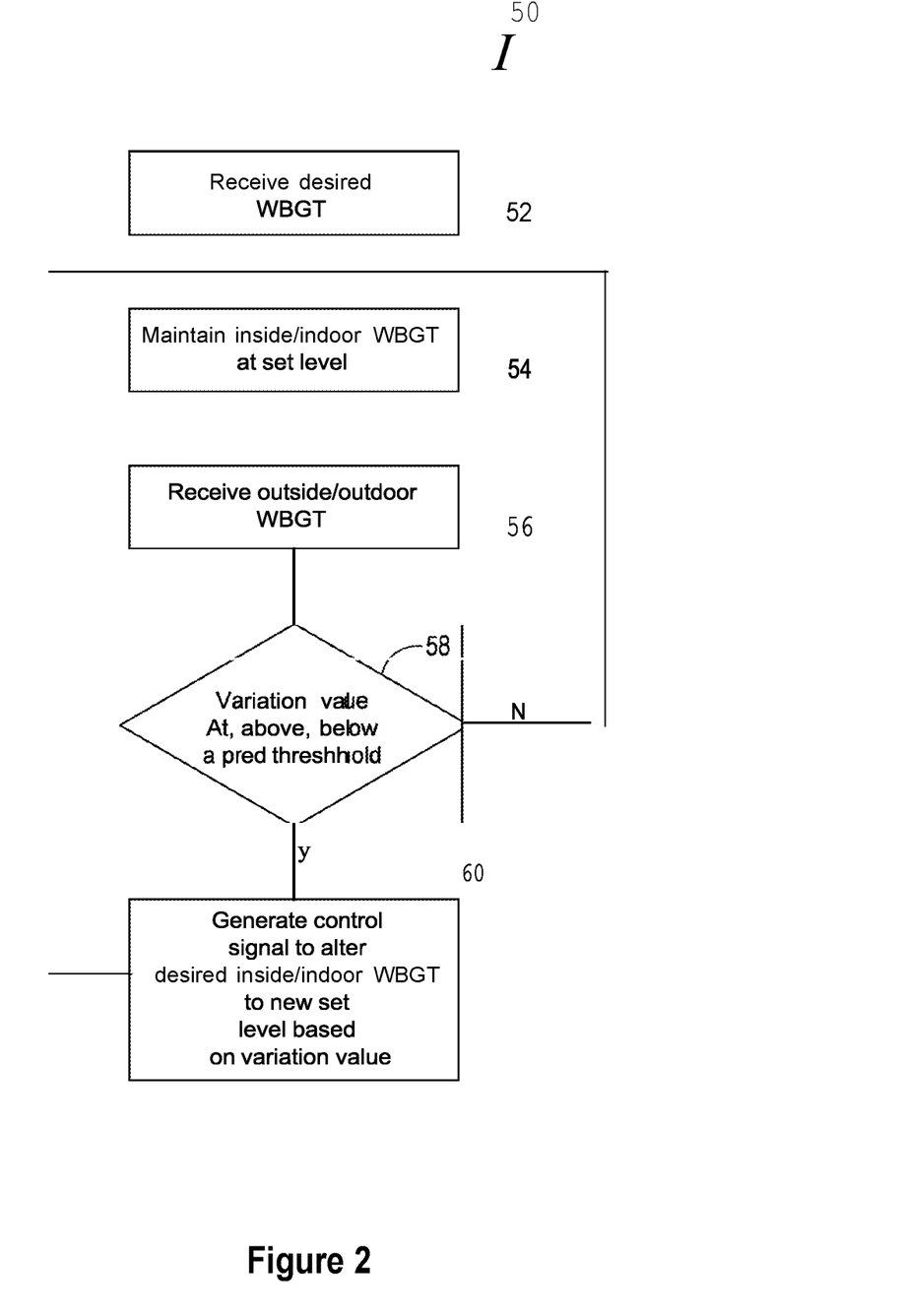
FIG. 2 shows a flow diagram of a method in accordance with an example embodiment of the invention.

Referring now to FIG. 2 of the drawings where a flow diagram of a method in accordance with an example embodiment of the invention is generally indicated by reference numeral 50. The method 50 may be applicable to systems not described herein. However, for ease of explanation, reference will be made to the use of the system 10 as described above for the explanation of the method 50.

The method 50 is typically a method for controlling the inside WBGT of a bedroom 12 of a person 14 to assist the person 14 achieve a better night's sleep. In this regard, the person 14 may input, by way of a suitable input interface of the system 10, a desired inside WBGT or range of WBGT acceptable to them. This may be an optional step as the method 50 need not have a desired inside WBGT to start from. Moreover, as the person 14 may not relate to WBGT, they may input a desired temperature and/or humidity, wherein the method 50 may comprise the step of calculating a desired inside WBGT based on the person's desired temperature and/or humidity selection.

In any event, the method 50 comprises receiving, at block 52, via the processor 20, a desired inside WBGT from the person 14, for example, prior to the person going to bed. The inside WBGT value is set in the system 10.

The method 50 comprises, receiving inside WBGT from the sensor Ti 24a and generating output control signals, by way of the processor 20, to maintain, at block 54, the inside WBGT to the desired level set in a manner described above by controlling the device 18.

The method 50 comprises, receiving, at block 56 via the processor 20, outside WBGT from the sensor To 24b. The method 50 then comprises determining, at block 58 by way of the processor 20 in a manner described above, the variation in the outside WBGT and obtaining a variation value. The variation value determined is compared with a suitable threshold value stored in the memory storage device, and if the determined variation value is at, above, or below a predetermined threshold, the method 50 comprises generating, at block 60 by way of the processor 20, one or more suitable control signals configured to operate the device 18 to alter the inside WBGT by the variation value. The altered inside WBGT is then set in the system 10 and the method 50 maintains the new set WBGT as described above with reference to block 54.

On the other hand, if the variation in the outside WBGT is negligible or if it is not at, above or below the predetermined threshold, i.e., the outside WBGT has not varied by the predetermined amount, the method 50 comprises maintaining the desired set WBGT either by the user 14 in step 52, or by the processor in step 60.

Figure 3:
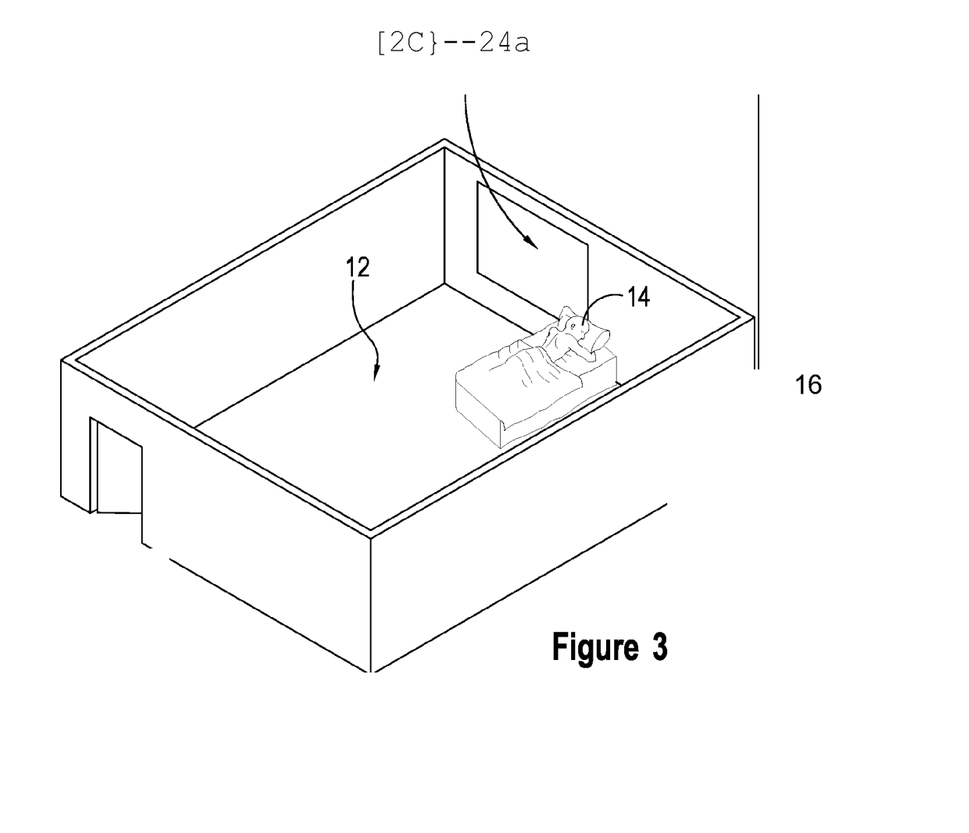
FIG. 3 shows another schematic diagram of a system in accordance with an example embodiment of the invention.

Referring to FIG. 3 of the drawings which shows another system in accordance with one example embodiment of the invention which is generally indicated by reference numeral 200. The system 200 is substantially similar to the system 10 and thus similar components will be referred to by the same or similar reference numerals and their function may be the same or similar as will be evident to those skilled in the field of invention.

The system 200 differs from the system 10 in that the system 200 comprises a device controller 202 which comprises a processor 220 and a memory storage device 222 which is very similar to the processor 20 and the device 22 as described above respectively. However, the processor 220 is configured to generate control signals of the type described above to alter the WBGT in the room 12 such that a nadir or inflection point of the WBGT in the room 12 occurs at a preselected time and/or based on outdoor WBGT as described above with reference to the system 10 and method 50.

The device 202 comprises a communications module 204 which is configured to transmit control signals wirelessly to operate the device 18. The device 202 may be configured to receive WBGT data from a suitable indoor WBGT sensor and/or suitable outdoor WBGT sensor in hardwired and/or wireless fashion (direct or indirect manner) similar to that described above.

The module 204 may be configured to transmit conventional remote-control signals to the device 18 so as to control operation of the device 18 wirelessly to either increase, stabilize or decrease the WBGT in the room 12 as the case may be. Moreover, the module 204 may be configured to enable the device 202 to communicate wirelessly with an endpoint computing device 206 over a communications network 208.

The network 208 may comprise one or more different types of communication networks. In this regard, the communication networks 208 may be one or more of the Internet, a local area network (LAN), a wide area network (WAN), a metropolitan area network (MAN), various types of telephone networks (e.g., Public Switch Telephone Networks (PSTN) with Digital Subscriber Line (DSL) technology) or mobile networks (e.g., Global System Mobile (GSM) communication, General Packet Radio Service (GPRS), Code Division Multiple Access (CDMA), and other suitable mobile telecommunication network technologies), or any combination thereof. It will be noted that communication within the network may be achieved via suitable wireless or hard-wired communication technologies and/or standards (e.g., wireless fidelity (Wi-Fi®), 4G, long-term evolution (LTE™), WiMAX, 5G, and the like).

The endpoint computing device 206 may comprise one or more processors and a computer memory (including transitory computer memory and/or non-transitory computer memory) similar to the type described above, configured to perform various data processing operations. The device 206 also includes a network communication interface (not shown) to connect to the device 202 via the network 208. Examples of the devices represented by the device 206 may be selected from a group comprising a personal computer, portable computer, smartphone, tablet, notepad, dedicated server computer devices, any type of communication device, and/or other suitable computing devices.

The device 206 may store a software application which may be downloaded onto and is executable by the device 206 to facilitate communication between the device 202 and the device 206 over the network 208 to the desired end described below. The software application may render a suitable graphical user interface which facilitates user interaction with the system 200.

In any event, like the system 10, the system 200 is typically a system for controlling the sleep environment 12 of the person 14, particularly an environment adjacent a person 14 sleeping.

Figure 4:
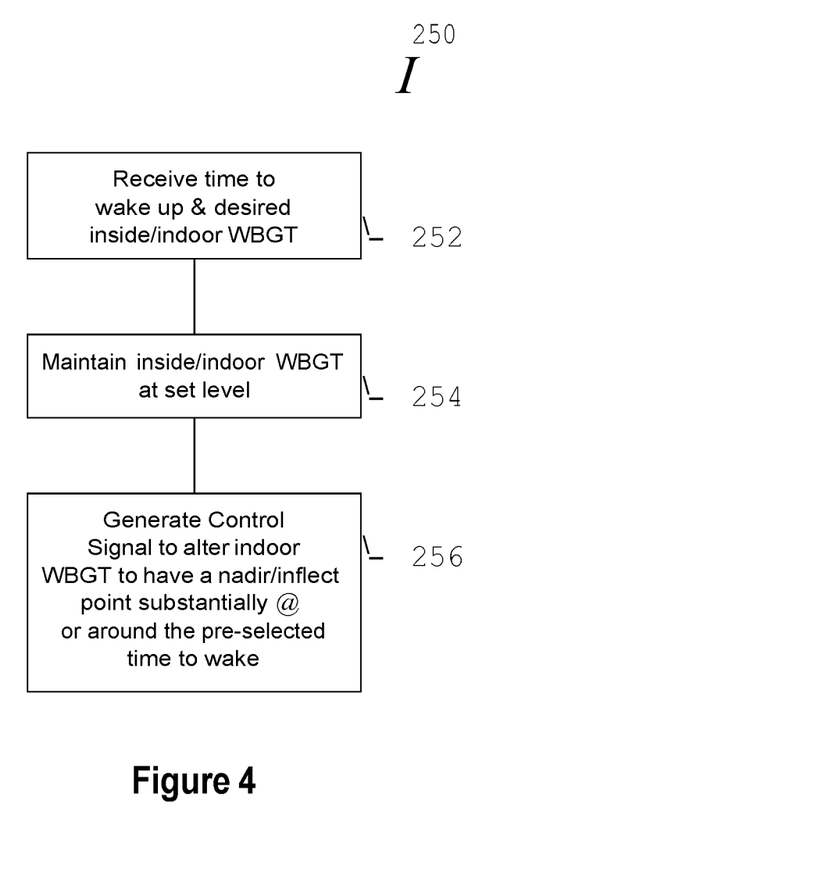
FIG. 4 shows another flow diagram of a method in accordance with an example embodiment of the invention.

In use, referring now also to FIG. 4 of the drawings where a high-level flow diagram of a method in accordance with an example embodiment of the invention is generally indicated by reference numeral 250. The method 250 may be used with other systems not illustrated but for ease of explanation, reference will be made to the system 200 of FIG. 3.

The method 250 comprises receiving, at block 252 by way of the software application executing on the device 206 a selected wake-up time and desired indoor WBGT from a user 14. The wake-up time and desired indoor WBGT is then transmitted to the device 202 via the network 208.

The method 250 comprises monitoring, at block 254 by way of the device 202, the inside/indoor WBGT in the room 12 as well as the time, for example, by polling a clock, etc. At, or near, the desired pre-selected wake up time, the method 250 comprises the step of generating control signals, at block 256, to control the device 18 to alter the monitored WBGT to have a nadir or inflection point occur which coincides substantially with the wake-up time, or is associated with the wake-up time. In this way, a nadir or inflection point which occurs naturally outdoors is mimicked or artificially recreated in an indoor sleep environment. Users are thus woken at a more biologically natural fashion linked to the nadir or inflection point of the WBGT in the sleep environment.

Figure 5:
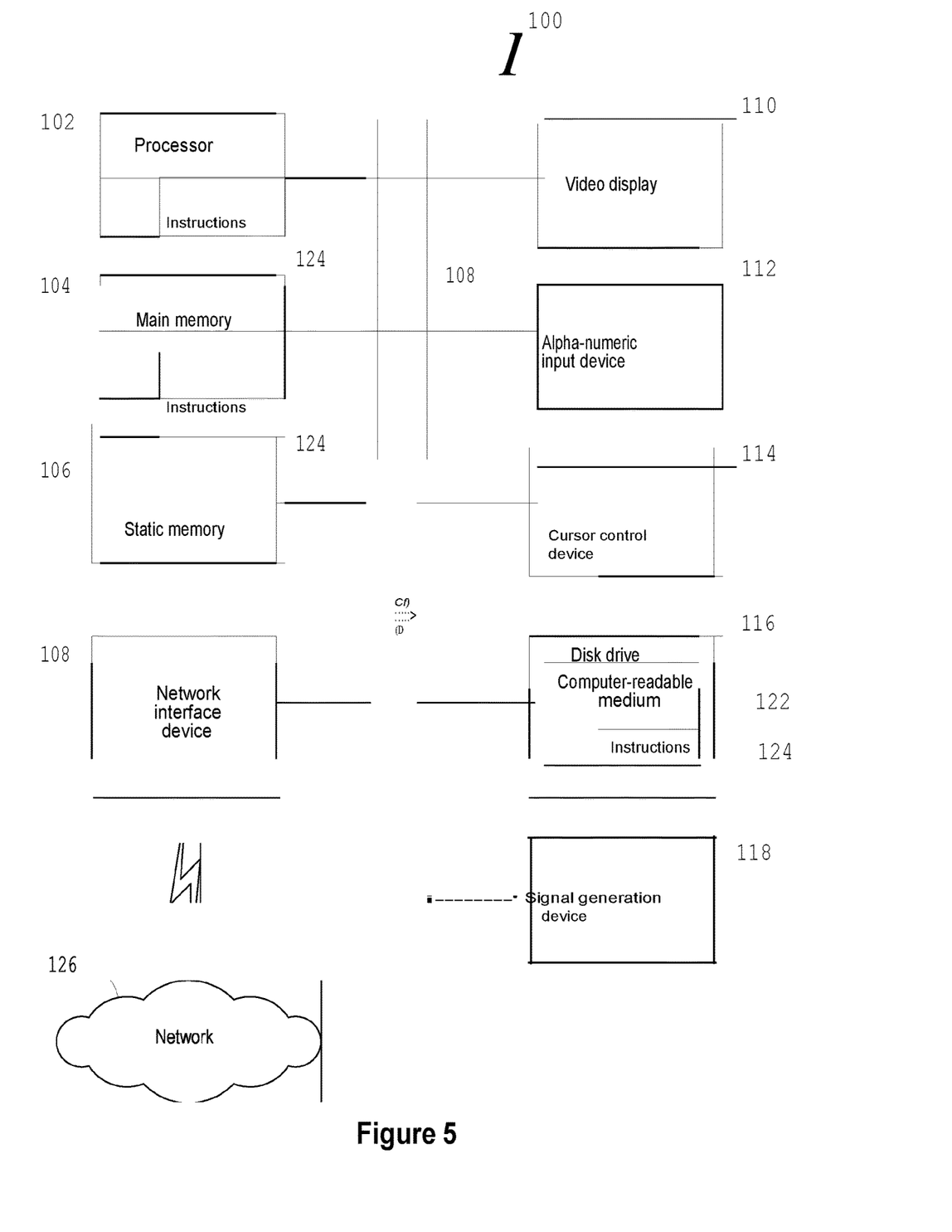
FIG. 5 shows a diagrammatic representation of a machine in the example form of a computer system in which a set of instructions for causing the machine to perform any one or more of the methodologies discussed herein, may be executed.

Referring now to FIG. 5 of the drawings which shows a diagrammatic representation of machine in the example of a computer system 100 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines, including virtual machines, that individually or jointly execute a set (or multiple sets) of instructions to perform any one or more of the methodologies discussed herein.

In any event, the example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse, or touchpad), a disk drive unit 116, a signal generation device 118 (e.g., a speaker) and a network interface device 120.

The disk drive unit 16 includes a non-transitory machine-readable medium 122 storing one or more sets of instructions and data structures (e.g., software 124) embodying or utilised by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilising any one of a number of well-known transfer protocols (e.g., HTTP).

Although the machine-readable medium 122 is shown in an example embodiment to be a single medium, the term "machine-readable medium" may refer to a single medium or multiple medium (e.g., a centralized or distributed memory store, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

The invention as described herein provides a convenient system to link human sleep patterns to those of temperature and humidity, particularly outside WBGT as well as nadir or inflection points which naturally occur. The Applicant is of the view that the present disclosure provides a method and system for mimicking a more desired form of controlling one's sleep patterns thereby to improve the ability of a person to wake more naturally from sleep.

The invention claimed is:

1. A method for encouraging natural sleep patterns through control of one or more electrically actuatable devices that affect one or more indoor environmental conditions of a sleep environment, wherein the method comprises:
monitoring one or more outdoor environmental conditions at an outdoor location by way of one or more suitable sensors;
based on the one or more outdoor environmental conditions detected by the one or more suitable sensors, sending sensor signals that reflect the one or more outdoor environmental conditions to a suitable processor operatively coupled to the one or more suitable sensors;
responsive to the sensor signals, the suitable processor automatically determining a particular inflection time;
wherein the particular inflection time is a time substantially at or around which the one or more outdoor environmental conditions reaches a nadir or inflection point; and
generating, by the suitable processor, one or more control signals to control the one or more electrically actuatable devices to alter the one or more indoor environmental conditions within the sleep environment to encourage natural sleep patterns;
wherein the one or more indoor environmental conditions is one or a combination of at least temperature, humidity, and wet-bulb globe temperature (WBGT);
wherein the one or more control signals control the one or more electrically actuatable devices to cause a nadir or inflection point for the one or more indoor environmental conditions to occur substantially at or around the particular inflection time.

2. The method as claimed in claim 1, wherein the nadir or inflection point for the one or more indoor environmental conditions is one or more lowest values of the one or more indoor environmental conditions prior to increase thereof by way of the one or more electrically actuatable devices.

3. The method as claimed in claim 1, wherein the one or more actuatable devices is selected from a group comprising an air-conditioning unit, a humidifier, and a combination of an air-conditioning unit and a humidifier configured to control or alter the wet-bulb globe temperature of the sleep environment, wherein the method comprises transmitting the one or more control signals generated to the one or more electrically actuatable devices directly or indirectly via a suitable device controller communicatively coupled to the one or more electrically actuatable devices.

4. The method as claimed in claim 1, further comprising:
monitoring the one or more indoor environmental conditions within the sleep environment by way of the one or more suitable indoor sensors;
wherein monitoring the one or more indoor environmental conditions within the sleep environment comprises receiving indoor environmental data from the one or more indoor sensors, wherein the indoor environmental condition data is indicative of one or more environmental conditions within the sleep environment.

5. The method as claimed in either claim 1, wherein the method comprises:
retrieving outdoor environmental condition data from an outdoor environmental condition data source, wherein the outdoor environmental condition data is indicative of the monitored one or more environmental conditions at the outdoor location; and
determining a variance value in the retrieved outdoor environmental condition data indicative of a variation of the one or more outdoor environmental conditions, and wherein the one or more control signals generated controls the one or more electrically actuatable devices to alter the one or more indoor environmental conditions within the sleep environment by the determined variance value so as to mimic the variation of the one or more monitored outdoor environmental condition within the sleep environment.

6. The method as claimed in claim 5, wherein the variance value is calculated as a percentage increase or decrease of the one or more outdoor environmental conditions monitored wherein the method comprises generating one or more control signals to control the actuatable devices to increase or decrease the one or more indoor environmental conditions in the sleep environment by the percentage increase or decrease calculated in respect of the one or more outdoor environmental conditions monitored.

7. A system for encouraging natural sleep patterns through control of one or more electrically actuatable devices that affect one or more indoor environmental conditions of a sleep environment, the system comprising:
- a memory storage device configured to store data; and
- a processor communicatively coupled to the memory storage device and configured to:
  monitor one or more outdoor environmental conditions at an outdoor location by way of one or more suitable sensors;
  based on the one or more outdoor environmental conditions detected by the one or more suitable sensors, send sensor signals that reflect the one or more outdoor environmental conditions to a suitable processor operatively coupled to the one or more suitable sensors;
  responsive to the sensor signals, the processor automatically determines a particular inflection time;
  wherein the particular inflection time is a time substantially at or around which the one or more outdoor environmental conditions reaches a nadir or inflection point; and
  the processor generates one or more control signals to control the one or more electrically actuatable devices to alter the one or more indoor environmental conditions within the sleep environment to encourage natural sleep patterns;
  wherein the one or more indoor environmental conditions is one or a combination of at least temperature, humidity, and wet-bulb globe temperature (WBGT);
  wherein the one or more control signals control the one or more electrically actuatable devices to cause a nadir or inflection point for the one or more indoor environmental conditions to occur substantially at or around the particular inflection time.

8. The system as claimed in claim 7, wherein the nadir or inflection point for the one or more indoor environmental conditions is one or more lowest values of the one or more indoor environmental conditions prior to increase thereof by way of the one or more electrically actuatable devices.

9. The system as claimed in claim 7, wherein the one or more actuatable devices is selected from a group comprising an air-conditioning unit, a humidifier, and a combination of an air-conditioning unit and a humidifier configured to control or alter the wet-bulb globe temperature of the sleep environment.

10. The system as claimed in claim 7, wherein the system comprises a transmitter module communicatively coupled to the processor, wherein the transmitter module is configured to transmit the one or more generated control signals to the one or more electrically actuatable devices directly or indirectly via a suitable device controller communicatively coupled to the one or more electrically actuatable devices, wherein the system comprises one or more suitable device controllers.

11. The system as claimed in claim 7, wherein the processor is further configured to:
  monitor the one or more indoor environmental conditions within the sleep environment by way of the one or more suitable indoor sensors;
  wherein monitoring the one more indoor environmental conditions within the sleep environment comprises receiving indoor environmental condition data from the one or more indoor sensors, wherein the indoor environmental condition data is indicative of one or more environmental conditions within the sleep environment.

12. The system as claimed in claim 7, wherein the processor is configured to:
  retrieve outdoor environmental condition data from an outdoor environmental condition data source, wherein the outdoor environmental condition data is indicative of the monitored one or more environmental conditions at the outdoor location; and
  determine a variance value in the retrieved outdoor environmental condition data indicative of a variation of the one or more outdoor environmental conditions,
  and wherein the one or more control signals generated by the processor is configured to control the one or more electrically actuatable devices to alter the one or more indoor environmental conditions within the sleep environment by the determined variance value so as to mimic the variation of the one or more monitored outdoor environmental condition within the sleep environment.

13. The system as claimed in claim 7, wherein the processor is configured to calculate the variance value as a percentage increase or decrease of the one or more outdoor environmental conditions monitored, and wherein the processor is configured to generate one or more control signals to control the actuatable devices to increase or decrease the one or more indoor environmental conditions in the sleep environment by the percentage increase or decrease calculated in respect of the one or more outdoor environmental conditions monitored.

14. An apparatus comprising:
  at least one heat exchanger;
  at least one humidifier;
  a memory storage device; and
  a processor communicatively coupled to the at least one heat exchanger, at least one humidifier and memory storage device configured to:
  receive outdoor environmental condition data from an outdoor environmental condition data source, wherein the outdoor environmental condition data is indicative of a wet-bulb globe temperature (WBGT) at an outdoor location;
  monitor the received outdoor environmental condition data to determine a variance value in the received environmental condition data indicative of a variation of the wet-bulb globe temperature (WBGT) at the outdoor location; and
  generate one or more control signals to control the heat exchanger and the humidifier to alter an indoor wet-bulb globe temperature (WBGT) within the sleep environment by the determined variance value so as to mimic the variation in the outdoor wet-bulb globe temperature (WBGT) within the sleep environment;
  wherein generating the one or more control signals causes one or more of:
  an increase of humidity indoors in response to an increase of humidity outdoors,
  an increase of temperature indoors in response to an increase of temperature outdoors,
  a decrease of humidity indoors in response to a decrease of humidity outdoors, and
  a decrease of temperature indoors in response to a decrease of temperature outdoors.

* * * * *

UNITED STATES PATENT AND TRADEMARK OFFICE
CERTIFICATE OF CORRECTION

| | |
|---|---|
| PATENT NO. | : 11,519,621 B2 |
| APPLICATION NO. | : 17/284425 |
| DATED | : December 6, 2022 |
| INVENTOR(S) | : Manger et al. |

It is certified that error appears in the above-identified patent and that said Letters Patent is hereby corrected as shown below:

In the Drawings

Please replace the Figure 5 with the attached Figure 5.

Signed and Sealed this
Seventh Day of March, 2023

Katherine Kelly Vidal
*Director of the United States Patent and Trademark Office*

Figure 5